Feb. 27, 1951     L. S. AUGSPURGER ET AL     2,543,311
PIPE UNION OR COUPLING
Filed May 26, 1950
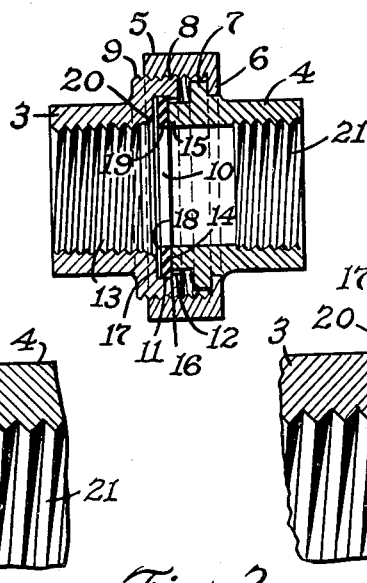
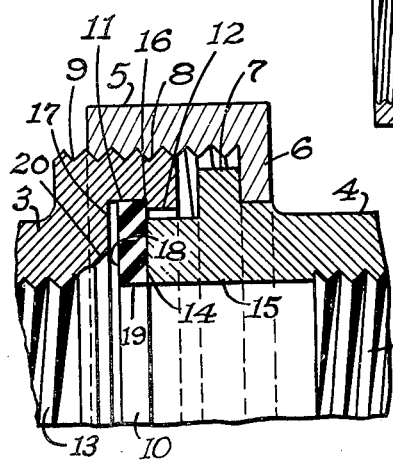
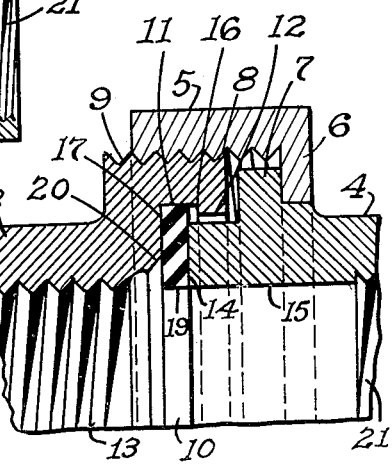
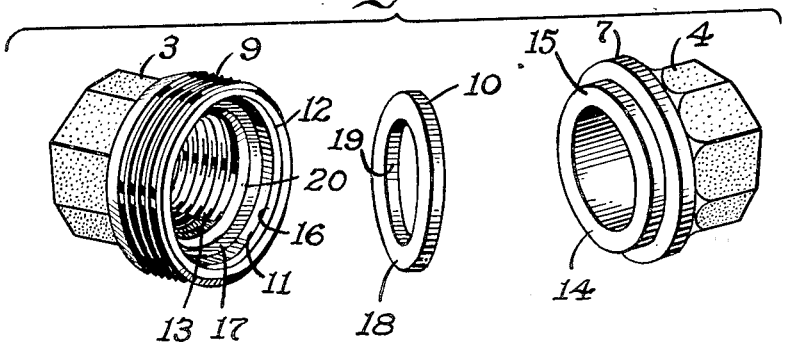
Inventors
Luther S. Augspurger
Delmas F. Hasse Patented Feb. 27, 1951

2,543,311

UNITED STATES PATENT OFFICE 2,543,311

PIPE UNION OR COUPLING

Luther S. Augspurger, Rockford, and Delmas F. Hasse, Roscoe, Ill., assignors to Aaero Manufacturing Co., Rockford, Ill., a corporation of Illinois Application May 26, 1950, Serial No. 164,564

4 Claims. (Cl. 285—122)

This invention relates to a new and improved pipe union or coupling.

The principal object of our invention is to provide a coupling or union, which, by virtue of its novel construction, does not have to be tightened with a wrench nor even by hand, to prevent leakage, and can be connected and disconnected repeatedly without showing any evidence of wear and consequent leakage, couplings of such character being particularly advantageous for detachably connecting the water inlet and outlet hose connections for service type water softeners of the bodily removable tank type, although, of course, the same are adapted for a wide variety of uses, and with various fluids and gases, wherever there are similar requirements and a coupling of the present description is suitable. Furthermore, the present invention is applicable wherever a union is needed, as on a valve and its pipe connection or where two pipes are to be connected, and on traps, etc.

The salient feature of the present coupling is the provision in connection with the gasket or seal ring, which is of rubber or other suitable compressible resilient material, of an annular internal groove in one end portion of the bore in one of the two detachably connectible parts of the coupling, the seal ring fitting in the groove with a fairly close fit peripherally but being adapted to be expanded radially to a slight extent to effect a seal peripherally in the groove and being movable axially and adapted to be so moved by fluid pressure toward the outer side wall of the groove to effect a seal there and on the end face of the adjacent end portion of the other of the two detachably connectible parts of the coupling as soon as the coupling parts are connected and fluid pressure is applied.

The invention is illustrated in the accompanying drawing, wherein—

Fig. 1 is a central longitudinal section through a pipe union or coupling made in accordance with our invention;

Fig. 2 is an exploded perspective view of those parts of the coupling with which the invention is particularly concerned, and Figs. 3 and 4 are enlarged fragmentary sectional details, Fig. 3 showing the relationship of the seal ring to the other parts when the nut is left loose, as in Fig. 1, and Fig. 4 showing the condition when the nut is tightened to the point of gripping and compressing the gasket.

The same reference numerals are applied to corresponding parts in these four views.

Referring to the drawing, reference numerals 3 and 4 designate the two main body parts or halves of the coupling adapted to be detachably connected by a conventional gland nut 5, which has its annular flange 6 in abutment in the usual way with the annular flange 7 on part 4 and has its internal threads 8 threading in the usual way on the external threads 9 on part 4, whereby to hold the parts 3 and 4 in coupled relation and draw them together upon tightening of nut 5. In the old style union or coupling a gasket was usually arranged to be compressed directly between flat end faces on the two body parts of the union or coupling, upon tightening of the nut, and, obviously, one had to be very careful and see to it that the nut was tightened with a wrench, because the gasket had to be actually compressed mechanically to make the joint water-tight or fluid-tight. Some unions had no gasket but relied for water-tightness or fluid tightness upon the tight wedging of tapered metal parts in one another, and there again, the nut had to be tightened well with a wrench. In the present case, a seal ring or gasket 10 of rubber or other suitable compressible resilient material is provided but is not mechanically compressed between parts 3 and 4, the present union or coupling relying upon fluid or hydraulic pressure upon the seal ring 10 to prevent leakage. This ring 10 has a close sliding fit in an annular internal groove 11 provided in the enlarged end portion 12 of the bore 13 of part 3, and is arranged to have sealing contact on its one face with the flat end face 14 provided on the end portion 15 of the other part 4 which projects into the enlarged end portion 12 of the bore on part 3, as clearly appears in Figs. 1, 3 and 4. The ring 10 also is arranged to have sealing contact on the same side with the annular shoulder 16 defining the outer side of the groove 11 but only when the ring 10 is held in contact with this shoulder 16 under fluid or hydraulic pressure, as when the nut 5 is not tightened, as appears in Figs. 1 and 3. When the nut 5 is tightened with a wrench, like other couplings, the ring 10 is compressed between the end face 14 on part 4 and the annular shoulder 17, defining the inner side of the groove 11. On the other hand, if the nut 5 is left loose or is drawn up fairly loosely by hand as far as it will go, then the hydraulic or fluid pressure in the line is active against the back face 18 of the ring 10 to hold it in sealing contact with the end face 14 and annular shoulder 16, and the same pressure acting against the inner circumference 19 of the ring expands it radially to a slight extent to insure a tight seal peripherally in the groove 11. The inner end of the bore 13 is relieved as indicated by the bevel 20 to expose the back face of the ring 10 to the hydraulic or fluid pressure so as to be sure of having the ring 10 pressed tightly into sealing engagement with the end face 14 and annular shoulder 16.

The operation of the union or coupling is believed to be clear from the foregoing description. With the present construction there is no danger of leakage whether the nut 5 is threaded only a few turns by hand or is tightened as far as it will go by hand, or is tightened partway or as far as it may be tightened with a wrench. When the nut is threaded all the way by hand or only part way, hydraulic or fluid pressure active against the back face 18 and inner circumference 19 of the ring is enough to insure good sealing engagement on the end face 14 on part 4 and against annular shoulder 16 and the bottom of the groove 11 on part 3. Someone not familiar with the operation of this improved union or coupling and believing it to be necessary to tighten the nut 5 in the usual way can do so without any harm being done, because then the ring 10 is merely compressed mechanically between the end face 14 on part 4 and the annular shoulder 17 on part 3. Even then, the fact that the bore 13 in part 3 is relieved at 20 accounts for the fluid or hydraulic pressure being active against at least a portion of the back face 18 of ring 10 to help hold it in tight sealing engagement with the end face 14 on part 4. Although the bore 13 in part 3 and the bore 21 in part 4 are both shown as internally threaded for connection with pipes it should be understood that the part 3 may be an integral part of the body of a globe valve or the like, and that the invention is applicable wherever a union or coupling is needed. When such a union or coupling is applied to traps, the gland nut will require tightening with a wrench to insure a water-tight joint.

It is believed the foregoing description conveys a good understanding of all of the objects and advantages of our invention. The appended claims have been drawn with a view to covering all legitimate modifications and adaptations.

We claim:

1. In a connection of the character described, the combination of adjacent tubular sections, one of which has an enlargement of its bore at one end adapted to receive an end portion of the companion section, a coupling nut detachably connecting said sections, the first mentioned section having an annular shoulder defined therein at the inner end of the enlargement of the bore and also having an annular internal groove provided therein, and a sealing ring of compressible and radially expansible resilient material having its inner periphery exposed to the interior of the coupling and subject therefore to fluid pressure therein and having a close sliding fit on its outer periphery in said groove, said ring having an axial dimension less than that of said groove on at least that radially outer portion which projects into said groove and adapted to be moved bodily axially under internal pressure in said coupling into sealing engagement on one side face thereof with the outer side of the annular groove and the end portion of the companion section and also adapted to be expanded radially under the same internal pressure into sealing engagement on its outer periphery with the bottom of the annular groove, said ring being also adapted to be moved bodily axially into abutment with said annular shoulder upon inward movement of the one tubular section relative to the other and be compressible between the two tubular sections when the coupling nut is tightened.

2. A connection as set forth in claim 1 wherein the first mentioned section has a radially inner portion of the annular shoulder cut away annularly so as to expose a substantial portion of the adjacent side face of the seal ring to the pressure in said connection.

3. In a connection of the character described comprising two mating tubular sections, the male section having an annularly projecting flange thereon, the female section having an externally threaded portion of larger diameter than the flange, and a gland nut abutting the flange and threading on the threaded portion to draw the mating sections more or less together, the improvement consisting in the provision of a sealing ring of resilient gasket material abutting the end of the male section annularly and slidable axially with a close fit peripherally thereof in an internal annular groove provided in the female section spaced from the end thereof, said ring having an axial dimension less than that of said groove on at least that radially outer portion which projects into said groove, whereby said ring is adapted to slide axially in the female section under internal pressure in said connection into sealing abutment with the end of the male section.

4. In a connection of the character described comprising two mating tubular sections, the male section having an annularly projecting flange thereon, the female section having an externally threaded portion of larger diameter than the flange, and a gland nut abutting the flange and threading on the threaded portion to draw the mating sections more or less together, the improvement consisting in the provision of a sealing ring of resilient gasket material rectangular in section with the greater dimension of the rectangular section radially disposed with respect to the bore of said connection, said ring engaging peripherally thereof in an internal annular groove provided in the bore of the female section spaced from the end thereof, said ring being exposed to the interior of the connection and subject to fluid pressure therein and adapted to have at least the radially inner portion thereof moved axially under internal pressure in said connection into sealing engagement on one side face thereof with the end of the male section.

LUTHER S. AUGSFURGER.
DELMAS F. HASSE.

REFERENCES CITED

The following references are of record in the file of this patent:

UNITED STATES PATENTS

| Number | Name | Date |
|--------|------|------|
| 455,180 | Doman | June 30, 1891 |
| 549,510 | Hall | Nov. 12, 1895 |